United States Patent
Uchino et al.

(12) 
(10) Patent No.: US 6,814,116 B2
(45) Date of Patent: Nov. 9, 2004

(54) TIRE WITH SPECIFIED RUBBER-STEEL CORD COMPOSITE

(75) Inventors: Osamu Uchino, Tokyo (JP); Shun Nakamura, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 182 days.

(21) Appl. No.: 09/985,848

(22) Filed: Nov. 6, 2001

(65) Prior Publication Data
US 2002/0088522 A1 Jul. 11, 2002

(30) Foreign Application Priority Data
Nov. 9, 2000 (JP) .................................... 2000-341910

(51) Int. Cl.$^7$ .............................. B60C 1/00; B60C 9/00
(52) U.S. Cl. ....................................... 152/451; 152/565
(58) Field of Search ................................ 152/565, 537, 152/564, 451

(56) References Cited

U.S. PATENT DOCUMENTS 4,933,385 A    6/1990  Yamamoto et al.

OTHER PUBLICATIONS

Abstract of JP 61–213232, Sep. 22, 1986, Bridgestone Corp.
Abstract of JP 62–007729, Jan. 14, 1987, Bridgestone Corp.
Abstract of JP 09–316201, Dec. 9, 1997, Yokohama Rubber Co. Ltd.

*Primary Examiner*—Adrienne C. Johnstone
(74) *Attorney, Agent, or Firm*—Sughrue Mion, PLLC

(57) ABSTRACT

In a tire is used a rubber-steel cord composite of a steel cord and a rubber composition comprising at least one rubber ingredient and a bismaleimide compound, wherein an amount of the bismaleimide compound is 0.1–5 parts by weight based on 100 parts by weight of the rubber ingredient.

20 Claims, 2 Drawing Sheets

TIRE WITH SPECIFIED RUBBER-STEEL CORD COMPOSITE

BACKGROUND OF THE INVENTION

1. Field of the Invention

This invention relates to a tire using a rubber-steel cord composite, and more particularly to an improvement of a plated portion of a steel cord between a plated steel cord and a coating rubber.

2. Description of Related Art

A rubber composition applied as a coating rubber to a belt layer of a tire reinforced with, for example, steel cords is an important rubber contributing to a durability of the tire. As a property required in such a rubber composition, there are (1) high hardness, (2) low heat build-up, (3) good adhesion to steel cord, (4) high resistance to deterioration and so on. Among these performances, the increase of the hardness (1) is an effective means for suppressing shearing strain between belt layers to improve the durability of the tire.

As a method of increasing the hardness, there have hitherto been made (a) a method of increasing a compounding amount of a filler such as carbon black or the like, (b) a method of adding a resin or the like, (c) a method of increasing a compounding amount of a crosslinking agent such as sulfur or the like, (d) a method of increasing a compounding amount of a vulcanization accelerator, and so on.

In the methods (a) and (b), however, the hardness is certainly increased, but the low heat build-up property lowers to degrade the thermal durability.

In the method (c), when the rubber composition is left at an uncured state, sulfur blooms out to considerably lower the workability, and also even if a tire could be manufactured, the resistance to deterioration of rubber lowers and hence the tire durability may be degraded.

In the method (d), when the amount of the vulcanization accelerator compounded is increased up to a certain level, there are not cause problems in the workability, low heat build-up property and resistance to deterioration, but if the amount is too large, there may be caused a problem that the adhesion to the steel cord lowers.

SUMMARY OF THE INVENTION

It is, therefore, an object of the invention to provide a tire having an excellent durability by improving a rubber-steel cord composite.

The inventors have made various studies in order to achieve the above object and found the following knowledge and, as a result, the invention has been accomplished.

That is, it is considered that bismaleimide directly crosslinks polymers such as natural rubber or the like therebetween without using a sulfur, so that the hardness of a rubber composition can be increased without damaging the low heat build-up property and the resistance to deterioration in rubber. And also, it has been found that such an effect can be obtained at a certain level by the addition of the bismaleimide alone, but when the bismaleimide is added together with a trans-polybutadiene, a reversion liable to be increased by the bismaleimide can be suppressed to further improve the high hardness and low heat build-up property. Furthermore, it has been found that the adhesion between a rubber composition and a steel cord can be improved by adding a bismaleimide alone or together with a trans-polybutadiene.

On the other hand, a cobalt salt, which serves as an adhesion promoter in the adhesion between a rubber composition and a steel cord, is required in order to promote the adhesion. But it also possesses an action of degrading the resistance to deterioration of a rubber composition. In the invention, it is possible to decrease an amount of a cobalt salt by using a bismaleimide alone or by using a bismaleimide and a trans-polybutadiene when a cobalt salt is used in the rubber composition.

Further, it has been found that the adhesion can be more improved by combining the above rubber composition with a novel steel cord as mentioned later.

According to the invention, there is the provision of a tire using a rubber-steel cord composite of a steel cord and a rubber composition comprising at least one rubber ingredient selected from natural rubber and synthetic diene rubbers, and a bismaleimide compound, an amount of the bismaleimide compound being compounded of 0.1–5 parts by weight based on 100 parts by weight of the rubber ingredient.

In the invention, it is favorable that a trans-polybutadiene is further compounded in an amount of 0.1–15 parts by weight based on 100 parts by weight of the rubber ingredient, that the rubber ingredient contains not less than 50% by weight of natural rubber, and that the bismaleimide compound is represented by the following general formula (I):

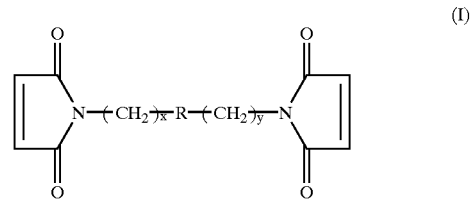

wherein R is an aromatic group having a carbon number of 6–18 or an alkyl-aromatic group having a carbon number of 7–24, and x and y are an integer of 0 to 3, respectively.

And also, it is favorable that the steel cord is a brass-plated mono-filament steel cord comprising one steel filament containing at least one of cobalt atom and nickel atom in a surface layer region ranging from a surface of a steel filament plated with a brass up to a depth of 15 nm inward in a radial direction of the filament and having a surface copper concentration of 15–45 atomic %, or a multifilament steel cord obtained by twisting a plurality of the above steel filaments.

Further, it is favorable that a total amount of cobalt atom and nickel atom contained in the surface layer region is not less than 0.1 atomic % but not more than a content of copper atom, preferably 0.5–5.0 atomic %, and that cobalt atom and nickel atom not contained as an oxide in the surface layer region is not less than 50 atomic % of the total amount of cobalt atom and nickel atom contained in the surface layer region, and that an average thickness of the plated brass is 0.13–0.30 μm, and that a diameter of the steel filament is not more than 0.40 mm.

BRIEF DESCRIPTION OF THE DRAWINGS

The invention will be described with reference to the accompanying drawings, wherein.

DETAILED DESCRIPTION OF THE INVENTION

Figure 1:
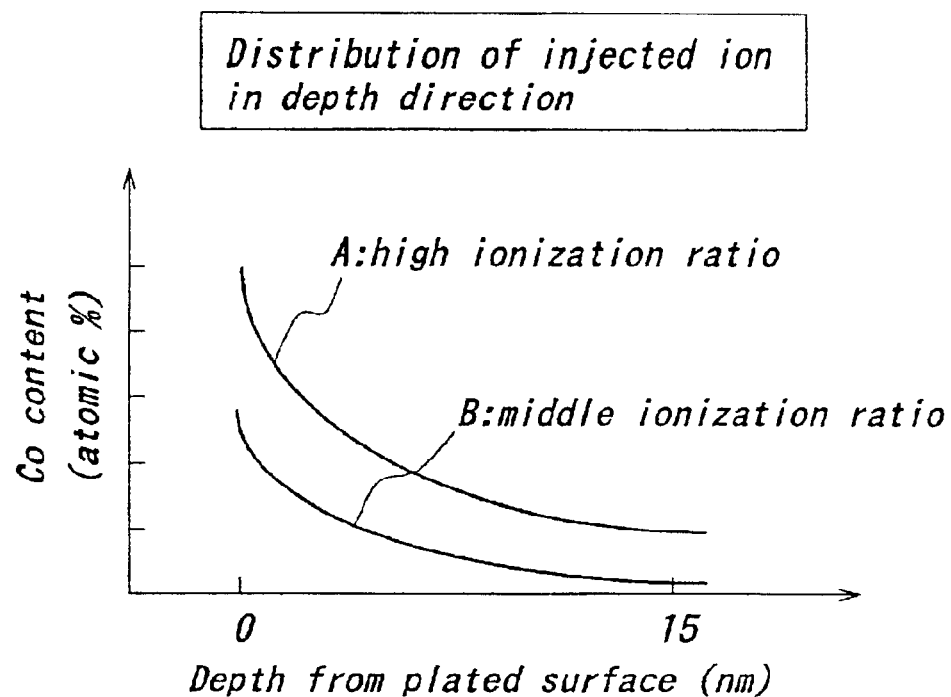
FIG. 1 is a graph showing a distribution of Co content in a depth direction inward from a plated surface when Co is implanted into a brass plated surface through ion implantation.

In the tire according to the invention is arranged a rubber-steel cord composite of a steel cord and a specified rubber composition (as a coating rubber).

The rubber ingredient for the coating rubber is at least one of natural rubber and synthetic diene rubbers, but is preferable to contain not less than 50% by weight of natural rubber. When the amount of natural rubber is less than 50% by weight, there may be a lowering of adhesion property and fatigue properties of a vulcanized rubber composition. As the synthetic diene rubber, mention may be made of styrene-butadiene rubber (SBR), butadiene rubber (BR), butyl rubber (IIR), halogenated butyl rubber (X-IIR), preferably brominated butyl rubber (Br-IIR), paramethyl styrene group-containing butyl rubber (concretely, copolymer of isobutyrene and p-halogenated methylstyrene, and the like), ethylene-propylene-diene rubber (EPDM), isoprene rubber (IR) and so on.

In case of SBR, it is preferable to be a solution-polymerized SBR having a vinyl bond (1,2-bond) content in butadiene portion of 10–85%, preferably 10–70% and a bound styrene content of not more than 30% by weight. That is, when the vinyl bond content is not less than 35%, the resistance to heat aging can be improved, while when it is not more than 85%, the fatigue properties of a vulcanized rubber composition can be maintained. And also, when the bound styrene content is not more than 30% by weight, the lowering of the adhesion property can be suppressed.

In the invention, the amount of the bismaleimide compounded is 0.1–5 parts by weight based on 100 parts by weight of the rubber ingredient in both cases of using the bismaleimide alone and of using the bismaleimide together with the trans-polybutadiene. When the amount is less than 0.1 part by weight, the compounding effect is not developed, while when it exceeds 5 parts by weight, the reversion is increased to degrade the low heat build-up property.

As the bismaleimide suitable for the invention, mention may be made of N,N'-1,2-phenylene bismaleimide, N,N'-1,3-phenylene bismaleimide, N,N'-1,4-phenylene bismaleimide, N,N'-(4,4'-diphenylmethane) bismaleimide, 2,2-bis[4-(4-meleimidophenoxy)phenyl] propane, bis(3-ethyl-5-methyl-4-maleimidophenyl) methane and so on. Among them, N,N'-(4,4'-diphenylmethane) bismaleimide is more preferable. The rubber composition contains one or more of these bismaleimides.

Moreover, when x or y in the formula (I) is 4 or more, the molecular weight becomes larger and hence the effect of sufficiently increasing the objective dynamic storage modulus may be not obtained with respect to the given compounding amount.

The rubber composition used for the tire according to the invention is favorable to be compounded with a trans-polybutadiene for further improving the fatigue properties.

The trans-polybutadiene is favorable to have a trans-bond content of 82–98%, more preferably 86–98%. And also, when the weight-average molecular weight is within a range of 30,000–200,000, the workability at the uncured state can be improved but also the fatigue resistance of cured rubber can be maintained. The amount of the trans-polybutadiene compounded is favorable to be 0.1–15 parts by weight based on 100 parts by weight of the rubber ingredient from a viewpoint of compatibility with rubber, fatigue resistance of cured rubber and the like. Particularly, the effect becomes larger when the amount is within a range of 3–15 parts by weight, and the largest when the amount is within a range of 4–12 parts by weight.

The rubber composition according to the invention may properly be compounded with a reinforcing filler, a silane coupling agent, a vulcanizing agent, a vulcanization accelerator, an accelerator activator, an antioxidant, an antiozonant, a process oil, zinc white (ZnO), stearic acid and the like, which are usually used in rubber industry, if necessary.

Further, the steel cord plated with brass according to the invention will be described below.

As to the brass plated around the steel filament, the applicant/assignee have examined the adhesion property to the coating rubber by injecting Co ion into the plated brass of a conventional brass-plated steel filament while decreasing an amount of an adhesion promoter or adding no adhesion promoter in the coating rubber in order to clarify a relation between an initial adhesion property and a composition of the plated brass in a depth direction inward from a surface of the plated surface. That is, a relation between an ion injecting time and Co content on a brass plated surface and a relation between an ionization ratio of the implanted Co and a distribution of Co content in the depth direction are previously grasped by using an ion implantation technique and then a relation with the initial adhesion property is examined by variously controlling the Co content on the plated surface layer.

As a result, it has been newly found that it is most effective to inject Co from the plated surface up to a depth of 15 nm for improving the initial adhesion property. That is, it has been confirmed that when the initial adhesion property is evaluated at various stages while varying the Co containing region from the plated surface in the depth direction, as the Co containing region becomes enlarged in the depth direction, the initial adhesion property is improved, but if the Co containing region is enlarged to a depth exceeding 15 nm, further improvement of the initial adhesion property is not recognized, which means that the improving effect is saturated at the depth of 15 nm.

On the other hand, when the initial adhesion property is evaluated in the same manner while increasing the Co content only on the plated surface, it has been confirmed that the effect of improving the initial adhesion property is small unless Co is diffused up to a certain depth. And the effect does not come to an actual level of ensuring the initial adhesion property between a steel cord and the coating rubber wherein the amount of the cobalt metal salt is decreased or no cobalt metal salt is added.

In the invention, therefore, the surface layer region is defined as a region from the plated surface to a depth of 15 nm, wherein the improvement of the adhesion property as mentioned above is exerted.

Furthermore, the applicant/assignee have made various examinations on the Co content in the surface layer and found that the Co content is favorable to be not less than 0.1 atomic % but not more than Cu content in the surface layer region because when the Co content is less than 0.1 atomic %, the effect of improving the initial adhesion property may be poor, while when it exceeds the Cu content, the effect of improving the initial adhesion property is saturated. Preferably, the Co content is recommended to be within a range of 0.5–5.0 atomic %.

Figure 3:
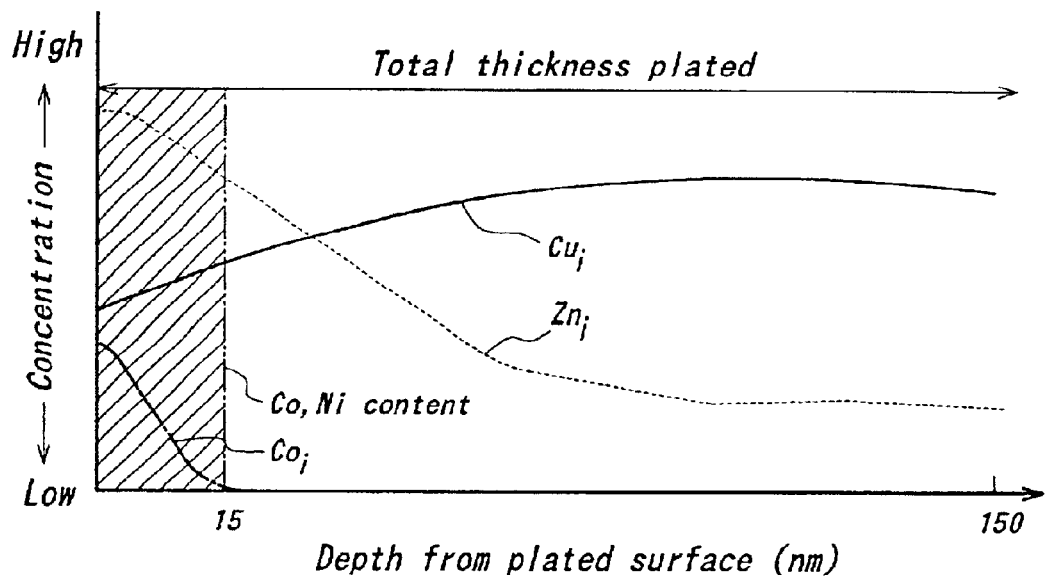
FIG. 3 is a graph showing a concentration distribution in a depth direction of each component with a plated brass.

Moreover, when the ion implantation is used for injecting Co restrictedly in the surface layer region, the Co content indicates a concentration gradient of gradually decreasing from the plated surface in the depth direction as shown in FIG. 1. The Co content in the surface layer region is obtained by preparing a depth profile as shown in FIG. 3 through an X-ray photoelectric spectrophotometry (XPS) and calculating Co atomic % quantity with respect to total atomic quantity of Cu, Zn and Co in the whole of the surface layer region. The Ni content is obtained in the same manner as is the case of Co.

The initial adhesion property is improved by injecting Co into the surface layer region. Because the effective diffusion of Cu in the inside of the plated portion during the vulcanization can be first realized by diffusing Co from the plated surface up to the depth of 15 nm. And also, when Co is diffused into a region of the plated portion exceeding the above depth, it is clear that the effect is saturated as previously mentioned, and the increase of the cost is caused by the increase of Co. Such a knowledge is also true in the case of Ni.

Figure 2:
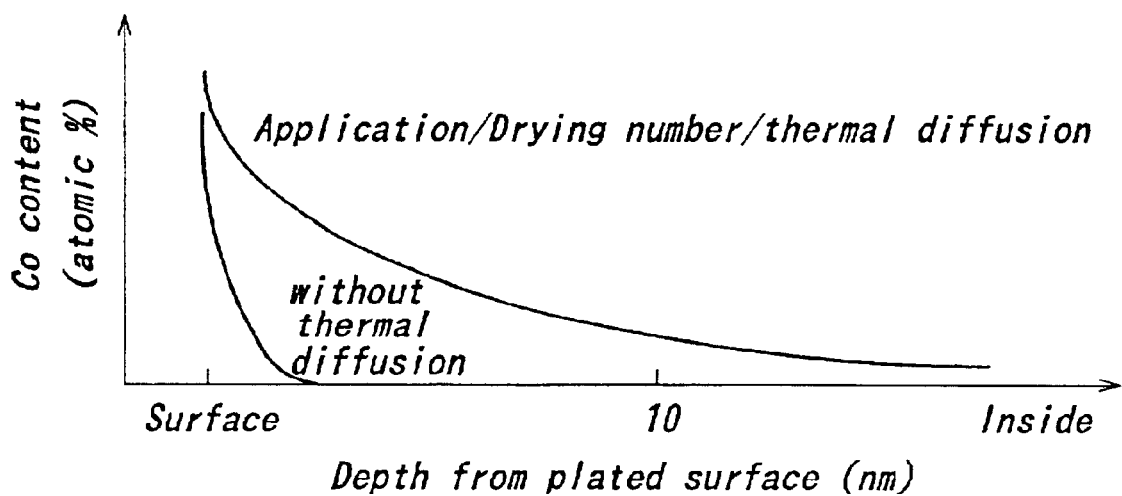
FIG. 2 is a graph showing a distribution of Co content in a depth direction inward from a plated surface when Co is thermally diffused into an inside of a plated brass at 200° C. after immersion in a colloid containing a cobalt metal salt and the drying.

Although the ion implantation technique is used in the invention for injecting Co from the plated surface in the depth direction, the applicant/assignee have examined the other method for injecting Co or Ni into the surface layer region of the brass plated portion. As a result, Co can be diffused into the inside of the plated portion corresponding to the depth of 15 nm by repeatedly conducting a step that the steel filament plated with a brass is immersed in, for example, a colloidal solution of 5–10 parts by weight of a cobalt metal salt and an adequate amount of a surfactant based on 100 parts by weight of water and dried, and thereafter subjected to a heat treatment at a temperature of 150–250° C. In this method, the Co content in the surface layer region can be adjusted by controlling at least one of immersion number, drying number and thermal diffusion number. An example of quantitative analytical results of Cu, Zn and Co elements in the depth direction of the thus formed plated steel filament through a photoelectric spectrophotometer is shown in FIG. 2 with respect to the Co content.

And also, it is possible to diffuse Co or Ni into the inside of the plated portion up to the depth of 15 nm by adding a proper amount of Co or Ni metal salt as an adhesion promoter to a lubricant at a drawing step of the steel filament in the production of the steel cord and utilizing heat generated during the drawing.

Then, the applicant/assignee have made various studies with respect to the Cu content on the plated surface. As the basic plating composition, it is required to consider the initial adhesion property and the adhesion durability such as heat-resistant adhesion and humidity-resistant adhesion after the vulcanization of the rubber composition. From a viewpoint of the adhesion durability, it is favorable that the Cu content on the outermost surface is limited to not more than 45 atomic %, preferably not more than 40 atomic %. On the other hand, it is required to contain a certain amount or more of Cu for ensuring the initial adhesion property. In this case, the Cu content is not less than 15 atomic %, preferably not less than 25 atomic %.

In FIG. 3 is shown a typical example of a distribution of each component concentration in the depth direction of the plated portion inclusive of the surface layer region by regulating the basic plating composition and Co content according to the invention.

In the invention, it is favorable that not less than 50 atomic % of the total amount of Co and Ni contained in the surface layer region are Co and/or Ni not contained as an oxide. Because, an oxide formed by bonding cobalt or nickel to oxygen is very stable owing to the strong bond between cobalt or nickel and oxygen and is very difficult to conduct a sufficient diffusion or movement of a metal element or a metal ion in the plated portion. As a result, the exchange reaction or substitution reaction between Co or Ni and Cu is not sufficiently promoted and hence an oxide does not serve as a good adhesion promoter.

Figure 4:
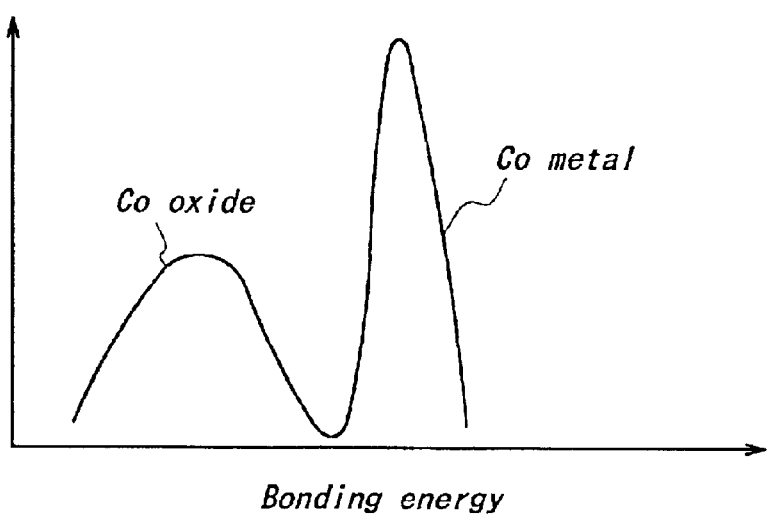
FIG. 4 is a schematic spectrum view of a state of Co on a brass plated surface diffracted through an X-ray photoelectric spectrophotometry.

Moreover, the amount of Co or Ni not contained as an oxide in the surface layer region can be determined from an area ratio of oxide to metal in a spectrum view of the respective element based on the results as measured by the X-ray photoelectric spectrophotometry. An example of a curve for Co is shown in FIG. 4.

Furthermore, the average thickness of the plated brass is advantageous to be 0.13–0.30 $\mu$m. When the average plated thickness is less than 0.13 $\mu$m, a portion exposing iron matrix is increased to obstruct the initial adhesion property, while when it exceeds 0.30 $\mu$m, the adhesion reaction is excessively promoted by heat generated in the use of the rubber article containing steel cords and hence only a brittle adhesion is obtained.

Moreover, the diameter of the steel filament is advantageous to be not more than 0.40 mm. When the filament diameter exceeds 0.40 mm, if the rubber article containing the steel cords is repeatedly subjected to strain under bending deformation in use, surface strain becomes large and the buckling is apt to be easily caused.

The quantification of Co in the plated portion is carried out by monitoring photoelectrons inherent to Cu, Zn, Co, 0 and C in a zone ranging from the plated surface to a depth as converted by an etching speed of $SiO_2$ of not less than 15 nm through the X-ray photoelectric spectrophotometry, quantifying amounts of the elements existing in each depth i while etching the plated portion with argon to measure each of $Cu_i$ atomic % and $Co_i$ atomic %, preparing a depth profile up to the depth of 15 nm (see FIG. 3), and calculating Co atomic % in the surface layer region from relative areas of Cu, Zn and Co at this region. Moreover, the plated thickness is 0.25 $\mu$m.

The $Cu_i$ atomic % and $Co_i$ atomic % are represented by the following equations:

$$Cu_i \text{ atomic }\% = [fcuCu_{in}/(fcuCu_{in}+fznZn_{in}+FcoCo_{in})] \times 100$$

$$Co_i \text{ atomic }\% = [fcoCo_{in}/(fcuCu_{in}+fznZn_{in}+FcoCo_{in})] \times 100$$

wherein fcu, fzn and fco are sensitivity coefficients of Cu, Zn and Co, respectively, and $Cu_{in}$, $Zn_{in}$ and $Co_{in}$ are count numbers of Cu, Zn, and Co at the position of the depth i and are represented by unit of count per second.

The steel cords according to the invention can be produced by ion implantation using a dry technique as mentioned above, or by repeating steps of immersing the brass plated steel filament in a colloidal solution containing a cobalt metal salt and a proper surfactant and drying it and thereafter subjecting to a heat treatment at 150–250° C. to diffuse Co into the plated surface layer region. In the latter case, the Co amount can be controlled by the number of immersing the filament into the colloidal solution, the drying number and the thermal diffusion number. This is also true in the case of Ni amount.

Moreover, the tire according to the invention may be inflated by an inert gas such as nitrogen or the like in addition to air.

The following examples are given in illustration of the invention and are not intended as limitations thereof.

There are prepared a rubber composition (for coating rubber) having a compounding recipe as shown in Table 1 or 2, and a rubber-steel cord composite using the same, and then the properties of the rubber composition and adhesion force between the rubber composition and a steel cord are measured by the following methods.

(1) Storage Modulus E' and Loss Factor tan δ

After the rubber composition is vulcanized under vulcanizing conditions of at 160° C. for 14 min, these properties are measured under an initial load of 160 g, a frequency of 52 Hz, a strain of 1% and a measuring temperature of 25° C. by means of a spectrometer (a testing machine of measuring dynamic viscoelasticity) made by Toyo Seiki Co., Ltd. The measured results are represented by an index on the basis that the result of Comparative Example 1 is set to 100. The larger the index value, the higher the modulus of the vulcanized rubber in case of E' and the better the low heat build-up property in case of tan δ.

(2) Retention of Elongation at Break (Eb) after Aging

After the rubber composition is vulcanized under the same condition as mentioned above, Eb before and after aging in air at 100° C. for 24 hours are measured according to JIS K6301-1995 (using No. 3 specimen) and the retention of Eb is determined by the following equation:

Retention (%)=100×(Eb after aging)/(Eb before aging).

In this case, the larger the numerical value, the higher the resistance to deterioration.

(3) Blooming Property after being Left to Stand for 3 Days

After the rubber composition is vulcanized under the same condition as mentioned above and left to stand at 25° C. for 3 days, the surface of the vulcanized rubber is visually observed, and the blooming property is evaluated as "good" that whiteness produced through blooming of sulfur is negligible and "poor" that whiteness produced through blooming of sulfur is observed.

(4) Adhesion Force between Rubber and Cord

A sample is prepared by arranging brass-plated steel cords (1×5 construction; filament diameter: 0.25 mm) in parallel to each other at intervals of 12.5 mm and coating them from both sides thereof with the above rubber composition. Then, the sample is vulcanized under vulcanization conditions of at 160° C. for 10 min, and thereafter the steel cord is pull out from the coating rubber according to ASTM D2229 and a ratio of surface area of the cord surface coated with rubber to the total surface area is measured visually. The larger the numerical value, the larger the adhesion force.

TABLE 1

(compounding unit: part by weight)

| | Comparative Example 1 | Comparative Example 2 | Comparative Example 3 | Comparative Example 4 | Example 1 | Example 2 | Comparative Example 5 |
|---|---|---|---|---|---|---|---|
| Natural rubber | 100 | 100 | 100 | 100 | 100 | 100 | 100 |
| Trans-polybutadiene *1 | — | — | — | — | — | — | 5.0 |
| Carbon black (N330) | 60 | 70 | 60 | 60 | 60 | 50 | 60 |
| Cobalt salt | 1.0 | 1.0 | 1.0 | 1.0 | 1.0 | 1.0 | 1.0 |
| Zinc oxide | 10 | 10 | 10 | 10 | 10 | 10 | 10 |
| vulcanization accelerator (DZ) | 1.0 | 1.0 | 1.0 | 2.0 | 1.0 | 1.0 | 1.0 |
| Sulfur | 6.0 | 6.0 | 8.0 | 6.0 | 6.0 | 6.0 | 6.0 |
| Bismaleimide | — | — | — | — | 2.0 | 2.0 | 6.0 |
| Steel cord | Conventional product | Conventional product | Conventional product | Conventional product | Conventional product | Conventional product | Conventional product |
| Storage modulus E' (index) | 100 | 121 | 134 | 129 | 140 | 125 | 121 |
| Loss factor δ (index) | 100 | 125 | 95 | 93 | 98 | 87 | 104 |
| Eb retention after aging (%) | 52 | 53 | 38 | 61 | 55 | 54 | 56 |
| Blooming property after 3 days | good | good | poor | good | good | good | good |
| Adhesion force between rubber and cord (%) | 70 | 80 | 95 | 30 | 90 | 90 | 50 |

*1: synthesized by a method of an Example 1 in U.S. Pat. No. 6,018,007

TABLE 2

(compounding unit: part by weight)

| | Example 3 | Example 4 | Example 5 | Comparative Example 6 |
|---|---|---|---|---|
| Natural rubber | 100 | 100 | 100 | 100 |
| Trans-polybutadiene *1 | 5 | — | 5 | — |
| Carbon black (N330) | 60 | 60 | 60 | 60 |
| Cobalt salt | 1.0 | — | — | — |
| Zinc oxide | 10 | 10 | 10 | 10 |
| vulcanization accelerator (DZ) | 1.0 | 1.0 | 1.0 | 1.0 |
| Sulfur | 6.0 | 6.0 | 6.0 | 6.0 |
| Bismaleimide | 2.0 | 2.0 | 2.0 | — |
| Steel cord | Conventional product | Invention product | Invention product | Invention product |
| Storage modulus E' (index) | 153 | 145 | 162 | 92 |

TABLE 2-continued

|  | (compounding unit: part by weight) | | | |
|---|---|---|---|---|
|  | Example 3 | Example 4 | Example 5 | Comparative Example 6 |
| Loss factor δ (index) | 92 | 91 | 89 | 93 |
| Eb retention after aging (%) | 61 | 65 | 68 | 60 |
| Blooming property after 3 days | good | good | good | good |
| Adhesion force between rubber and cord (%) | 80 | 90 | 80 | 50 |

*1: synthesized by a method of an Example 1 in U.S. Pat. No. 6,018,007

In Tables 1 and 2, cobalt salt is cobalt naphthenate, and vulcanization accelerator is N,N'-dicyclohexyl-2-benzothiazolyl sulfenamide (Noccelar DZ, trade mark, made by Ouchi Shinko Chemical Industrial Co., Ltd.), and bismaleimide is N,N'-(4,4'-diphenylmethane) bismaleimide, and steel cord (conventional product) is a conventional steel cord plated with brass (Cu: 63% by weight, Zn: 37% by weight, thickness plated: at least 15 nm) wherein Cu content at the surface is 15–45 atomic %, and steel cord (invention product) is a steel cord plated with brass according to the invention (Cu: 63% by weight, Co in the surface layer region: 0.5–5.0 atomic %, Cu content at the surface: 15–45 atomic %, average thickness plated: 0.13-0.3 μm), and antioxidant is N-(1,3-dimethylbutyl)-N'-phenyl-p-phenylene diamine (Nocrac 6C, trade mark, made by Ouchi Shinko Chemical Industrial Co., Ltd.).

As seen from Tables 1 and 2, the coating rubber containing a bismaleimide is high in the hardness, and relatively high in the low heat build-up property, resistance to deterioration, appearance and adhesion property, and the coating rubber further containing the trans polybutadiene is higher in the hardness and more excellent in the low heat build-up property and resistance to deterioration. Furthermore, the adhesion property is more improved in the rubber-steel cord composite containing specified brass-plated steel cords therein.

As mentioned above, according to the invention, there can be provided a rubber composition increasing rubber hardness without damaging the low heat build-up property, adhesion property to steel cord and resistance to deterioration, and steel cords capable of further improving the adhesion property, and rubber-steel cord composites made from such rubber composition and steel cord. Furthermore, the durability of the pneumatic tire can be improved by using the rubber-steel cord composition according to the invention.

What is claimed is:

1. A tire comprising a rubber-steel cord composite of a steel cord and a rubber compositions wherein the rubber composition comprises at least one rubber ingredient selected from natural rubber and synthetic diene rubbers, and N,N'-(4,4'-diphenylmethane) bismaleimide, in an amount of 0.1–5 parts by weight of the N,N'-(4,4'-diphenylmethane) bismaleimide based on 100 parts by weight of the rubber ingredient.

2. A tire according to claim 1, wherein the rubber ingredient contains not less than 50% by weight of natural rubber.

3. A tire according to claim 1, wherein the steel cord is a brass-plated monofilament steel cord comprising one brass-plated steel filament or a brass-plated multifilament steel cord obtained by twisting a plurality of brass-plated steel filaments, wherein an average thickness of the plated brass is 0.13–0.30 μm.

4. A tire according to claim 1, wherein the steel cord is a brass-plated monofilament steel cord comprising one brass-plated steel filament or a brass-plated multifilament steel cord obtained by twisting a plurality of brass-plated steel filaments, wherein a diameter of the steel filament is not more than 0.40 mm.

5. A tire comprising a rubber-steel cord composite of a steel cord and a rubber composition, wherein the rubber composition comprises at least one rubber ingredient selected from natural rubber and synthetic diene rubbers, a bismaleimide compound in an amount of 0.1–5 parts by weight based on 100 parts by weight of the rubber ingredient, and a trans-polybutadiene in an amount of 0.1–15 parts by weight based on 100 parts by weight of the rubber ingredient.

6. A tire according to claim 5, wherein the bismaleimide compound is represented by the following general formula (I):

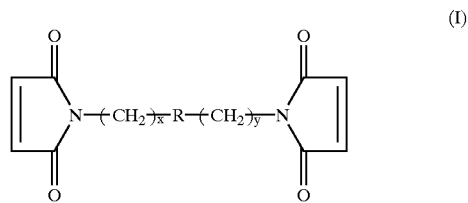

wherein R is an aromatic group having a carbon number of 6–18 or an alkylaromatic group having a carbon number of 7–24, and x and y are an integer of 0 to 3, respectively.

7. A tire according to claim 6, wherein the bismaleimide compound is N,N'-(4,4'-diphenylmethane) bismaleimide.

8. A tire according to claim 5, wherein the rubber ingredient contains not less than 50% by weight of natural rubber.

9. A tire according to claim 5, wherein the steel cord is a brass-plated monofilament steel cord comprising one brass-plated steel filament or a brass-plated multifilament steel cord obtained by twisting a plurality of brass-plated steel filaments, wherein an average thickness of the plated brass is 0.13–0.30 μm.

10. A tire according to claim 5, wherein the steel cord is a brass-plated monofilament steel cord comprising one brass-plated steel filament or a brass-plated multifilament steel cord obtained by twisting a plurality of brass-plated steel filaments, wherein a diameter of the steel filament is not more than 0.40 mm.

11. A tire comprising a rubber-steel cord composite of a steel cord and a rubber composition, wherein the rubber composition comprises at least one rubber ingredient selected from natural rubber and synthetic diene rubbers, and a bismaleimide compound in an amount of 0.1–5 parts by weight based on 100 parts by weight of the rubber ingredient, and wherein the steel cord is a brass-plated monofilament steel cord comprising one steel filament containing at least one of cobalt atom and nickel atom in a surface layer region ranging from a surface of a steel filament plated with a brass up to a depth of 15 mm inward in a radial direction of the filament and having a surface copper concentration of 15–45 atomic %, or a multifilament steel cord obtained by twisting a plurality of the above steel filaments.

12. A tire according to claim 11, wherein a total amount of cobalt atom and nickel atom contained in the surface layer region is not less than 0.1 atomic % but not more than a content of copper atom.

13. A tire according to claim 12, wherein the total amount of cobalt atom and nickel atom contained in the surface layer region is 0.5–5.0 atomic %.

14. A tire according to claim 11, wherein cobalt atom and nickel atom not contained as an oxide in the surface layer region is not less than 50 atomic % of the total amount of cobalt atom and nickel atom contained in the surface layer region.

15. A tire according to claim 11, wherein an average thickness of the plated brass is 0.13–0.30 μm.

16. A tire according to claim 11, wherein a diameter of the steel filament is not more than 0.40 mm.

17. A tire according to claim 11, wherein the rubber composition further comprises a trans-polybutadiene in an amount of 0.1–15 parts by weight based on 100 parts by weight of the rubber ingredient.

18. A tire according to claim 11, wherein the rubber ingredient contains not less than 50% by weight of natural rubber.

19. A tire according to claim 11, wherein the bismaleimide compound is represented by the following general formula (I):

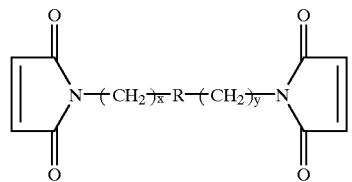

wherein R is an aromatic group having a carbon number of 6–18 or an alkylaromatic group having a carbon number of 7–24, and x and y are an integer of 0 to 3, respectively.

20. A tire according to claim 19, wherein the bismaleimide compound is N,N'-(4,4'-diphenylmethane) bismaleimide.

* * * * *